W. M. NECKERMAN.
TONG CARRIER.
APPLICATION FILED MAR. 24, 1913.

1,136,160.

Patented Apr. 20, 1915.
3 SHEETS—SHEET 1.

W. M. NECKERMAN.
TONG CARRIER.
APPLICATION FILED MAR. 24, 1913.
1,136,160.
Patented Apr. 20, 1915.
3 SHEETS—SHEET 2.
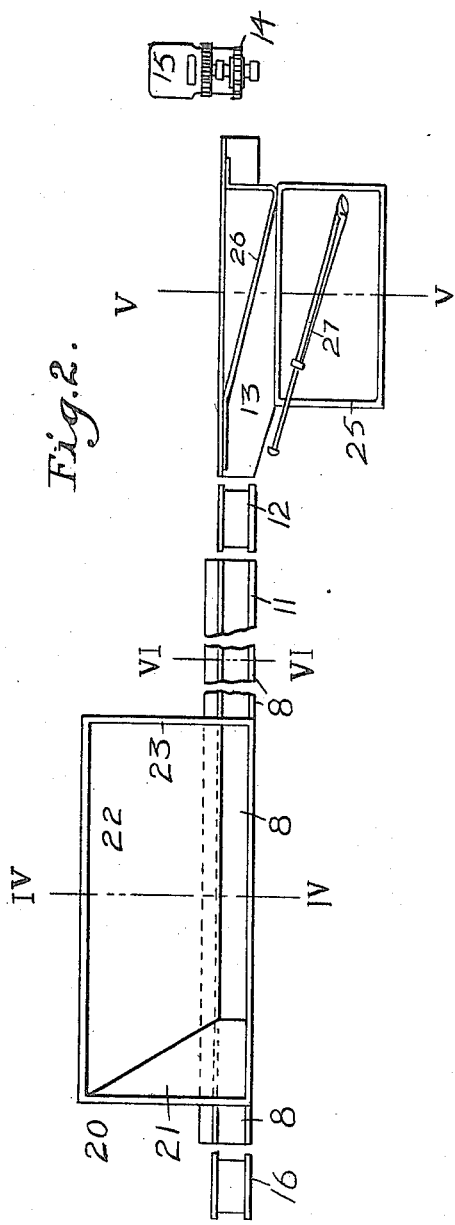
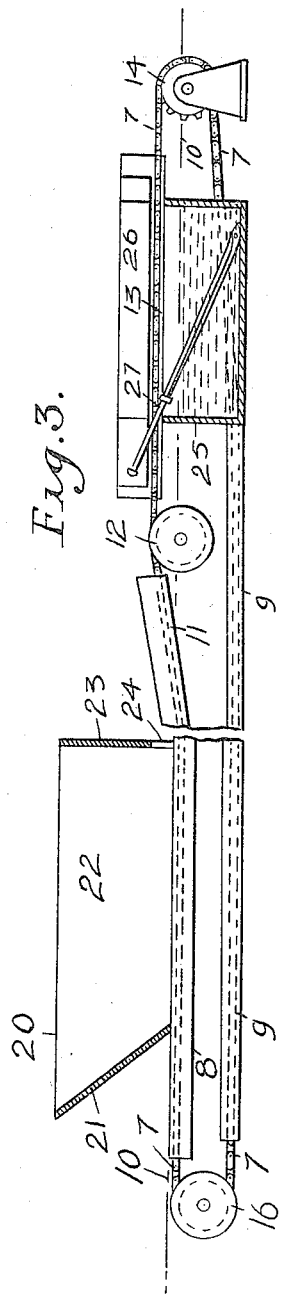
WITNESSES
INVENTOR

W. M. NECKERMAN.
TONG CARRIER.
APPLICATION FILED MAR. 24, 1913.

1,136,160.

Patented Apr. 20, 1915.
3 SHEETS—SHEET 3.

WITNESSES

INVENTOR
W. M. Neckerman,
by F. N. Barker,
attorney.

UNITED STATES PATENT OFFICE.

WILLIAM M. NECKERMAN, OF YOUNGSTOWN, OHIO.

TONG-CARRIER.

1,136,160.  Specification of Letters Patent.  Patented Apr. 20, 1915.

Application filed March 24, 1913. Serial No. 756,284.

*To all whom it may concern:*

Be it known that I, WILLIAM M. NECKERMAN, a citizen of the United States, residing at Youngstown, in the county of Mahoning and State of Ohio, have invented new and useful Improvements in Tong-Carriers, of which the following is a specification.

My invention has relation to the art of making welded pipe, and has particular reference to means for returning the tongs to the vicinity of the welder's position after they have been removed from the welded pipe. My invention also comprises means for cooling the tongs, preferably by means of a bosh at the welder's end of the tong-returning means. Ordinarily the tongs are removed by an attendant called the taker-off, who deposits them in a cooling tank or bosh, from which another attendant takes them and carries them to the welder. This involves the services of several men in more or less dangerous situations. It is the object of the present invention to provide an automatic endless carrier to which the taker-off delivers the tongs and by which they are taken back to a position, preferably near the welder, where they are automatically deposited in a cooling tank or bosh. Preferably the tong-carrier operates below the floor line and does not take up floor space except at the tong-delivery end of the carrier, where the carrier ascends so as to deposit the tongs in the bosh or other place readily accessible to the welder or to his assistant.

My invention may be used with any design of welding apparatus. Accordingly, I have shown this apparatus somewhat diagrammatically, thereby indicating the presence of the welding apparatus rather than any details thereof.

Figure 1:
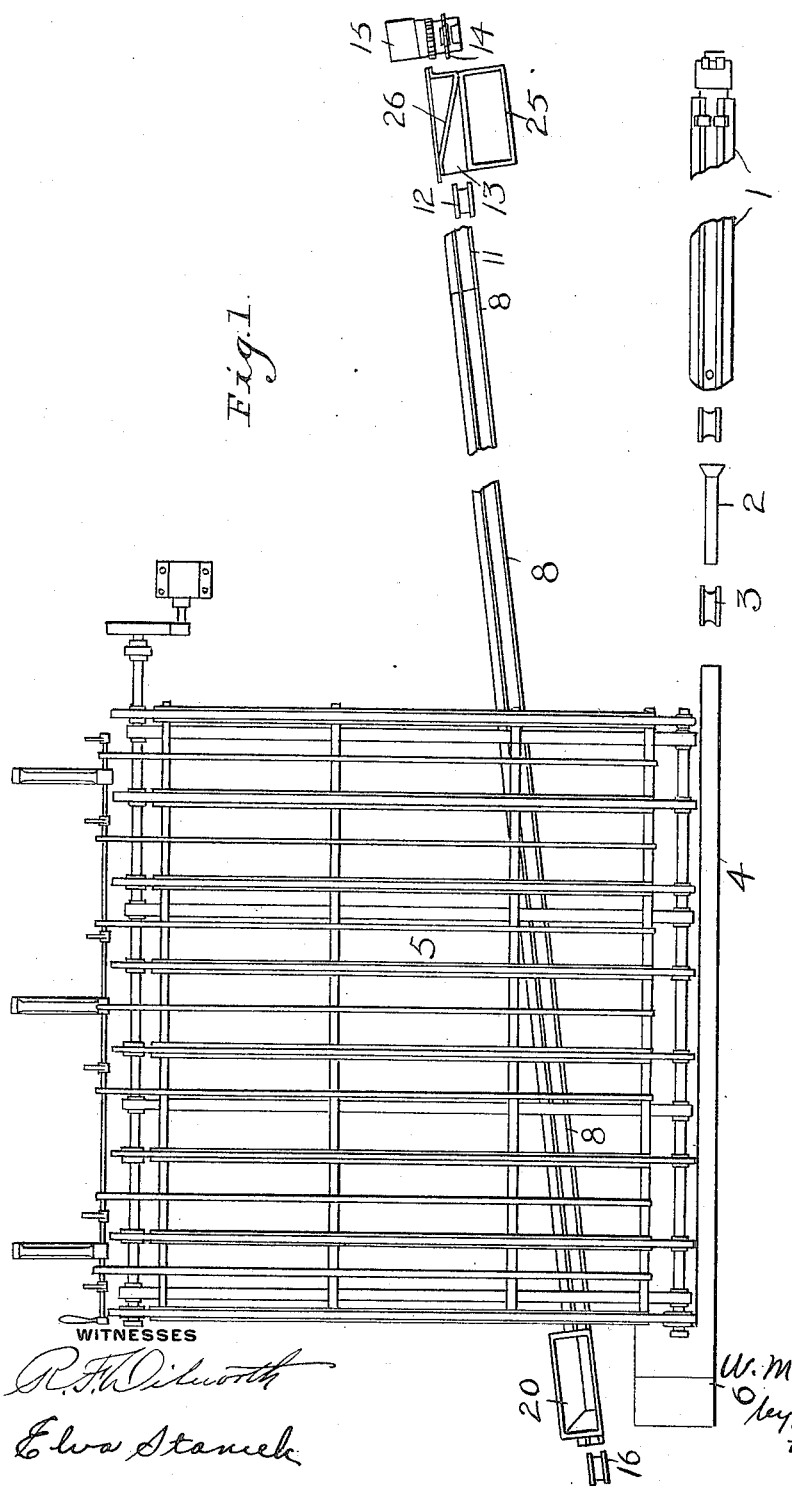
Figure 4:
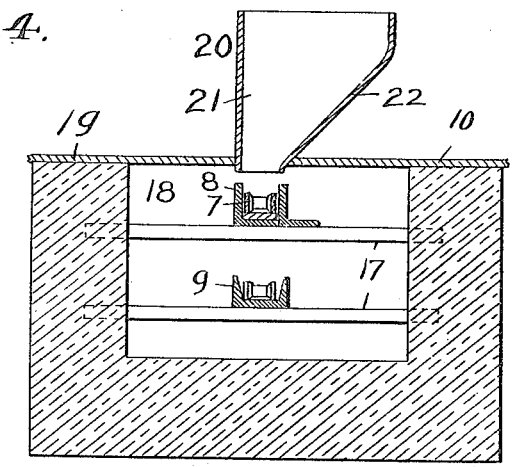
Figure 5:
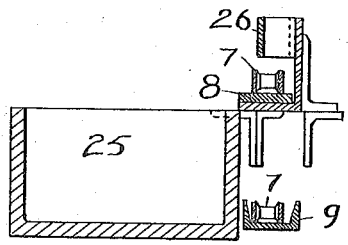
Figure 6:
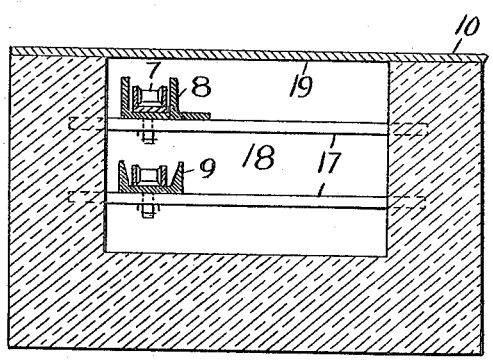

Referring to the accompanying drawings, Figure 1 is a plan view of a pipe-welding apparatus in connection with a plan of my invention, the parts being shown diagrammatically. Fig. 2 is a plan view of my invention with parts broken away. Fig. 3 is a side elevation of Fig. 2 with parts in vertical section. Figs. 4, 5, and 6 are, respectively, vertical sections on the lines IV—IV, V—V, and VI—VI on Fig. 2.

On the drawings, 1 represents a draw-bench which may be of any suitable design, but I prefer that shown and described in my application, Serial Number 707,285, filed July 2, 1912. After the pipe is drawn through the welding die, whether by the apparatus shown in my said application, or by the usual apparatus which employs a detachable hook to connect the tongs to the draw-chain, the tongs are disconnected from the chain without deflecting the tongs and pipe from the draw-chain, so that the pipe with the tongs attached thereto rides rearwardly on the draw-chain and through the guide 2 and sizing rolls 3. From the sizing rolls 3 the pipe and tongs enter the trough 4 from which the pipe is caused to travel laterally on the cooling rack 5 of any suitable design in the usual manner. The usual cooling-rack attendant disconnects the tongs from the pipe, 6 indicating the attendant's position. The apparatus thus far described is old.

From a point near the position 6, which may vary according to the type of drawing apparatus, I locate the receiving end of my tong-carrier, which in the present instance runs beneath the cooling rack 5 and the usual pit under the same to a point opposite the welder's position and as near his position as practicable or desirable.

The tong-carrier comprises the endless chain 7 and the upper and the lower guideways 8 and 9 therefor together with accessory apparatus presently to be described. The guideways 8 and 9 are channels, having a bottom on which the chain 7 runs, and two sides which keep the chain from running off from the bottom. The guideway 8 has its side sufficiently high to prevent the tongs which ride thereon from falling off from the chain. The guideways 8 and 9 are preferably below the floor line 10, except at the tong-delivery end, where the upper guideway 8 is inclined upwardly and in the direction of the travel of the chain thereon, as shown at 11 on Fig. 2, to a convenient point above the floor line 10. From the upper end of the inclined portion of the guideway 8 the chain runs on the idle roller 12, whence it runs horizontally on the section 13 of the guideway 8 to the sprocket-wheel 14, driven by the motor 15. The rear end of the chain 7 runs over the idle roller 16. The guideways 8 and 9 may rest on the bars 17 supported in the side walls of the pit 18 beneath the floor 19.

20 represents the chute or tong-skid arranged near the taker-off's position. It is a box-like structure with inclined rear-wall 21 and side-walls 22 but without a bottom forwardly of the wall 21. The side walls of the chute have a relative convergence so as to form a guideway by which the tongs can be deposited on the chain 7. The front wall 23 is cut away at 24 to permit the tongs to pass while riding on the chain 7.

A tank or tong-bosh 25 is located at the side of the section 13 of the guideway 8 and is supplied with water for cooling the tongs. The side of the section 13 nearest the draw-bench 1 is removed so that the tongs can slide off from the chain 7 when the leading end of the tongs engages the tong-deflector 26, which is a piece of metal set up edgewise over the chain and over the section 13 and inclined in the direction of the chain-travel and toward the tong-bosh 25. The deflector is in the line of travel of the tongs as they ride on the chain. The deflector pushes the tongs toward the bosh as the chain 7 carries the tongs until finally the tongs fall into the bosh as shown at 27. The bosh 25 is located near the front end of the draw-bench so that the tongs can be readily obtained by or for the welder.

It is readily seen that my tong-carrier can be used with any type of pipe-drawing apparatus. The tong-receiving end of the tong-carrier will be located near the taker-off's position wherever he may be and the delivery end will be as close to the welder as desired or practicable.

I do not restrict myself to the details and combinations shown and described except so far as the claims specifically require such details and combinations.

I claim—

1. The combination with a pipe-drawing apparatus, of a tong-carrier independent of the said apparatus and comprising a horizontal endless chain-carrier extending from a position near the rear end of the said apparatus to a position near the front end thereof, and a tong-skid for depositing the tongs upon the chain-carrier.

2. The combination with a pipe-drawing apparatus, of a tong-carrier comprising a horizontal endless chain-carrier extending from a position near the rear end of the said apparatus to a position near the front end thereof, a tong-skid for depositing the tongs upon the chain-carrier, and a tong-bosh into which the chain-carrier delivers the tongs.

3. In a pipe-mill, a pipe-drawing apparatus, a pit below the floor line independent of the said apparatus and extending from approximately the tong taker-off's position to a position near the front end of the said apparatus, an endless chain-carrier in the pit, and a tong-skid for depositing the tongs on the chain-carrier.

4. In a pipe-mill, a pipe-drawing apparatus, a pit below the floor line independent of the said apparatus and extending from approximately the tong taker-off's position to a position near the front end of the said apparatus, and an endless chain-carrier in the pit.

5. In a pipe-mill, a pipe-drawing apparatus, a pit below the floor line extending forwardly from the vicinity of the tong taker-off, an endless chain-carrier in the pit independent of the said apparatus, means for depositing the tongs on the chain-carrier, and means for causing the forward end of the chain-carrier to rise above the floor line.

6. In a pipe-mill, a pipe-drawing apparatus, a pit below the floor line extending forwardly from the vicinity of the tong taker-off, an endless chain-carrier in the pit independent of the said apparatus, means for depositing the tongs on the chain-carrier, means for causing the forward end of the chain-carrier to rise above the floor line, a tong-bosh at the forward end of the chain-carrier and means for automatically depositing the tongs in the tong-bosh.

7. The combination with a pipe-drawing apparatus, of a tong-carrier comprising a horizontal endless chain-carrier extending from a position near the rear end of the said apparatus to a position near the front end thereof, and a tong-bosh arranged to receive the tongs automatically from the chain-carrier.

8. The combination with a pipe-drawing apparatus, of a tong-carrier comprising a horizontal endless chain-carrier extending from a position near the rear end of the said apparatus to a position near the front end thereof, means for automatically deflecting the tongs laterally from the chain-carrier, and a tong-bosh arranged to receive the tongs when so deflected.

Signed at Youngstown, Ohio, this 19th day of March, A. D. 1913.

WILLIAM M. NECKERMAN.

Witnesses:
W. T. LAWTHERS,
E. T. MCCLEARY.

Copies of this patent may be obtained for five cents each, by addressing the "Commissioner of Patents, Washington, D. C."